United States Patent [19]

Nauta

[11] 4,153,372
[45] May 8, 1979

[54] MIXER

[76] Inventor: Constant J. Nauta, 1 Midden Duin en Daalseweg, Overveen, Netherlands

[21] Appl. No.: 773,575

[22] Filed: Mar. 21, 1977

[51] Int. Cl.² ............................................. B01F 7/00
[52] U.S. Cl. ................................... 366/142; 366/287; 403/122
[58] Field of Search ............... 366/306, 314, 309, 287, 366/142; 73/9, 10, 351, 343 R; 403/122, 143

[56] References Cited

U.S. PATENT DOCUMENTS

| 2,961,875 | 11/1960 | Reumund | 73/351 |
| 3,109,633 | 11/1963 | Nauta | 366/287 |

Primary Examiner—Robert W. Jenkins

[57] ABSTRACT

This invention pertains to a mixer screw and more particularly to the journal thereof in a vessel. There is provided temperature feeling means responsive to the heat of resistance generated during its operation, whereby the operator may be made aware of undesired changes in temperature.

10 Claims, 2 Drawing Figures

MIXER

BACKGROUND OF THE INVENTION

In devices of the character described, material to be mixed is placed in a mixing vessel and subjected to the rotary orbital movement of a mixing screw. Because of the load of the material in the vessel, as well as the characters of the material itself, the mixing screw is, on occasion, subjected to an excessive load which is demostrated by the generation of heat in its bearing mounting. Should this heat generation be ignored, damage to the bearing could occur with a resultant breakdown of the equipment as well as expensive loss of time and productivity.

DESCRIPTION OF THE PRIOR ART

U.S. Pat. No. 3,109,633, granted Nov. 5, 1963, discloses a mixing apparatus wherein the mixing screw is actuated to move in a rotary orbital path. It can be seen, however, that in this patent, no provision has been made for determining undesired increase in temperature at the bearing relation shown at 6, 7 or 25, 26. The patent to Reumund, U.S. Pat. No. 2,961,875, granted Nov. 29, 1960, discloses a temperature sensing device used in turbines and compressors.

SUMMARY OF THE INVENTION

The invention relates to a mixer, comprising a mixing vessel with at least one mixing screw that is journaled in the bottom of the vessel and is driven such, that the mixing screw makes simultaneously a turning movement around its axis and a revolving movement along the wall of the vessel, whereas on the bottom of the vessel a pin has been fixedly arranged that extends in a socket in the bottom side of the axis of the mixing screw.

A mixer of this type is known from practice. There exists the problem of control of the heat generation in the pin journal. When the mixing screw is heavily overloaded as a consequence of materials that can be mixed with difficulty or when the journal has grown filthy, the heat generation can become so high that the danger exists that the pin journal gets stuck so that the mixer becomes unserviceable or damaged.

The invention aims at removing this objection and providing a mixer in which the pin journal is protected against damage from overheating under all circumstances.

This aim is reached according to the invention, in that the pin journal comprises one or more temperature feelers with which undesired changes of temperature of the pin journal are measured. Thereby it is possible to discontinue the operation of the mixer in time when a substantial raise of temperature of the pin journal occurs.

According to an embodiment of the invention, in which the pin has a ball shaped point, one or more temperature feelers are arranged in the ball of the pin. This embodiment is very suitable for different types of mixing screws and pin journals.

The invention will now be elucidated referring to the accompanying drawing of some embodiments.

Figure 1:
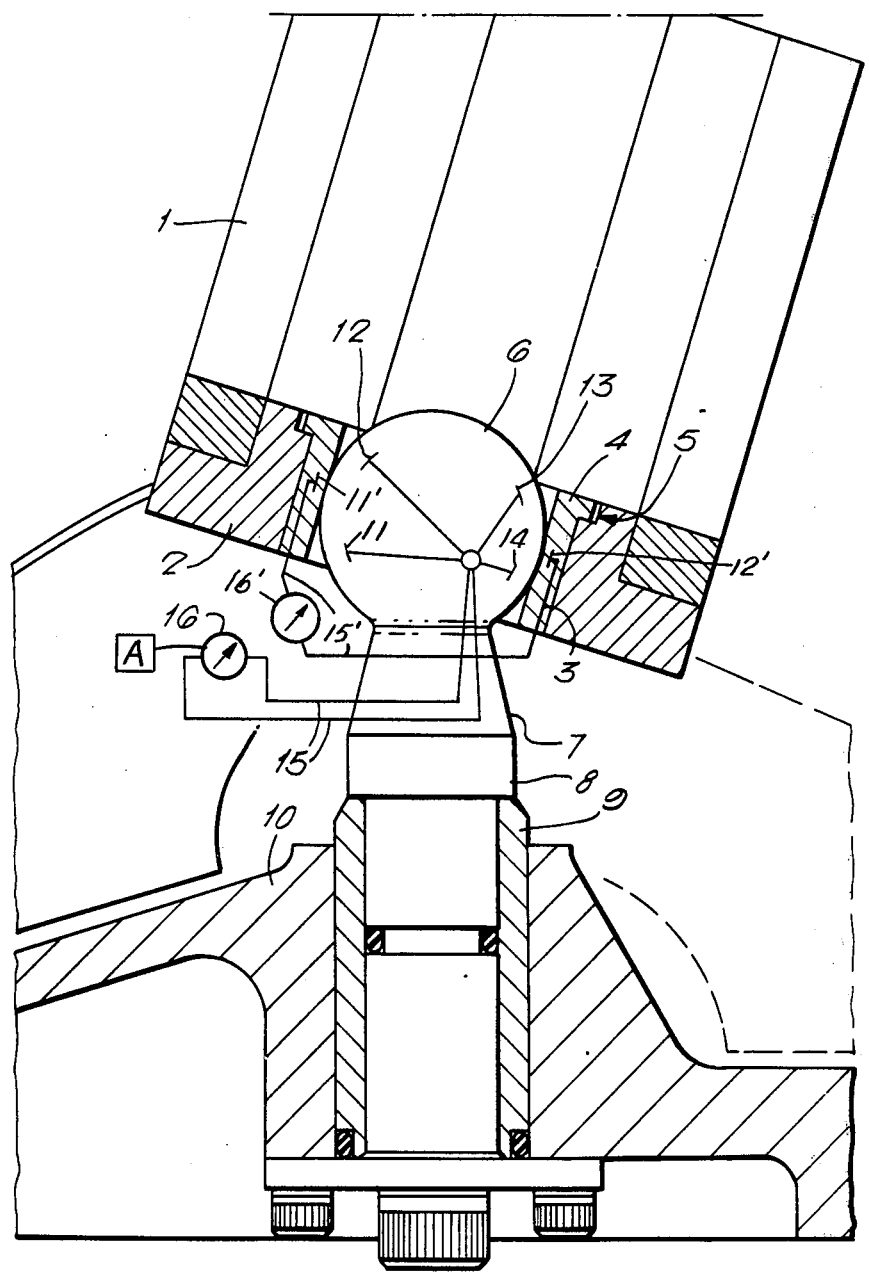
FIG. 1 shows a diagrammatical sideview in partial axial section of the pin journal on the bottom side of a shaft of a mixing screw.

According to FIG. 1, showing a first embodiment, the mixing screw shaft 1 comprises on the bottom side a socket in which a closure 2 has been arranged with a central bore which holds a radial slide journal 3. On the upper side the journal bushing 3 has a collar 4 which fits in a corresponding socket 5 on the inside of the closure 2. In the journal bushing 3 a ball 6 of the pin has been arranged, which ball rests on the lower side on a somewhat conical part 7 that has been mounted with a cilindrical part 8 in the bottom structure 9, 10.

In the ball 6 a number of temperature feelers 11,12,13,14 are present which are connected to a circuit 15, comprising a meter 16 which in his turn can be provided with an alarm device A, shown in FIG. 1, with which undesired temperature changes of the pin journal can be made known. A set of temperature feelers 11' and 12' may be in the complementary means or bearing collar 4 which are in circuit 15' to signal rise in bearing temeprature as well as pin ball temperature.

Figure 2:
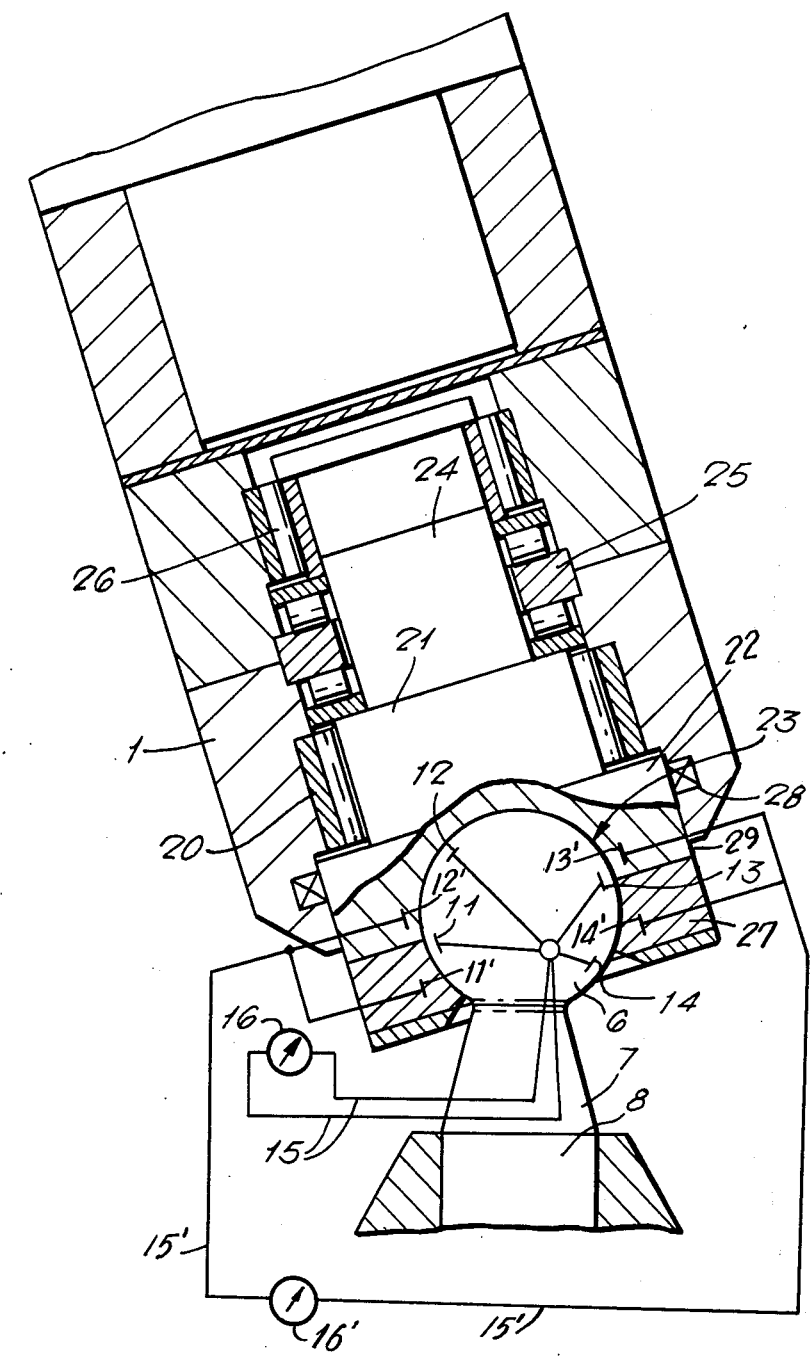
FIG. 2 shows a variant of the journal shown in FIG. 1.

According to FIG. 2, showing a second embodiment, a radial roller journal 20 has been arranged in the central bore at the lower side of the mixing screw shaft 1. The cilindrical pin socket element 22 is mounted with a sealing element 23 in the bore part 29 of this central bore. In the radial roller journal 20 extends the first part 21 of a pin socket shaft, which has a smaller diameter than the pin socket element 22 that has a ball shaped socket 23 in which the ball 6 of the pin 7,8 extends. Above the part 21 of the pin socket shaft a reduced part 24 is present, which is journaled by means of an axial thrust journal 25 and a radial journal 26, preferably also a roller or needle journal, which is journaled in the bore of the mixing screw shaft 1.

At the bottom side 22 the closure ring 27 is present which has been fastened to the pin socket 22, e.g. by means of bolts (not shown), so that the pin ball 6 cannot leave the socket 22.

Also here the temperature feelers 11,12,13 and 14 are present which are connected to a measuring system 15,16, preferably also with an alarm device also temperature feelers 11', 12', 13' and 14' are in the complementary means 27, 29 to signal temperature rise in the bearings 27, 29 in addition to those in the pin ball 6. These feelers are connected to circuit 15' having a meter 16' to distinguish a temperature rise in the bearings 27, 29 from a rise in temperature of the pin ball 6.

I claim:

1. A material mixer comprising a vessel, mixing screw means in said vessel, said screw means being driven in an orbital path about its own axis and about the inner wall of said vessel; means journalling said screw means in said vessel, comprising a pin ball fixed to said vessel and complementary means on said shaft, operatively associated with said pin ball; said pin ball journal further comprising temperature feeling means, whereby undesired changes in temperature of the pin ball journal are measured.

2. A material mixer according to claim 1 characterized in that said temperature feeling means are in said pin ball.

3. A material mixer according to claim 1 characterized in that the temperature feeling means is arranged in said complementary means.

4. A material mixer according to claim 1, further comprising closure means operatively associated with said complementary means and retaining said pin ball against undesired separation; said temperature feeling means being arranged in said closure means.

5. A material mixer according to claim 4, wherein said closure means further comprises a ball shaped socket enclosing said pin ball.

6. A material mixer according to claim 1, wherein said temperature measurement further comprises an alarm whereby said undesired temperature changes can be made known.

7. A material mixer according to claim 1, wherein said complementary means is a socket having a cylindrical slide bushing freely slidable over said pin ball axially of said mixing screw means.

8. A material mixer according to claim 1, wherein said complementary means is a socket which includes a shouldered shaft having a first part adjacent said pin socket, said first part being of a diameter less than that of the socket and is journalled in said mixing screw means, said journal comprising radial rollers.

9. A material mixer according to claim 8, wherein said pin socket extends in a bore of the mixing shaft, said bore being sealed.

10. A material mixer according to claim 8, wherein said shouldered shaft is provided with a second part of a diameter smaller than that of the first part, said second part including axial thrust journal means and further radial roller means journalled in said mixing screw shaft.

* * * * *